United States Patent [19]
Dickfeldt et al.

[11] 3,859,133
[45] Jan. 7, 1975

[54] ELECTROCHEMICAL DEVICE HAVING A CASING FORMED OF WRAPPED TAPE

[75] Inventors: Siegfried Dickfeldt, Hagen-Haspe; Karl Steffens, Hagen-Vorhalle, both of Germany

[73] Assignee: Varta Batterie A.G., Hanover, Germany

[22] Filed: Dec. 13, 1973

[21] Appl. No.: 424,225

[30] Foreign Application Priority Data
Dec. 18, 1972 Germany............................ 2261959

[52] U.S. Cl.................................. 136/166, 136/132
[51] Int. Cl. ............................................ H01m 1/02
[58] Field of Search .......................... 136/166–170, 136/134 R, 134 P, 135 R, 135 P, 14, 131–132, 133, 175–176

[56] References Cited
UNITED STATES PATENTS

| | | | |
|---|---|---|---|
| 3,220,886 | 11/1965 | Simonton | 136/132 |
| 3,733,219 | 5/1973 | Courtot | 136/132 X |
| 3,761,314 | 9/1973 | Cailley | 136/134 R |

*Primary Examiner*—Anthony Skapars
*Attorney, Agent, or Firm*—Gerard J. Weiser; Alfred Stapler; Karl L. Spivak

[57] ABSTRACT

A tightly sealed casing for an electrochemical device, such as an electrochemical cell, is formed by wrapping the device in an adhesive-coated tape. Also wrapped within the tape are connector plates to which the connectors protruding from the device itself are joined. The head spaces of the resulting assembly are filled with casting resin.

10 Claims, 6 Drawing Figures

PATENTED JAN 7 1975 3,859,133

ELECTROCHEMICAL DEVICE HAVING A CASING FORMED OF WRAPPED TAPE

The invention relates to an electrochemical cell with tightly closed casing, and particularly to a galvanic element with an electrolyte-tight casing.

Cell casings are known for electric storage batteries in which the casing wall is formed by a tape which is preferably wrapped several times around the electrode stack, and in which the several layers are joined together by gluing and/or welding. In such batteries a separate casing lid and a separate casing bottom are glued to the cell block, or welded or screwed to it, and the plate lugs of the cell protrude right through the lid or the bottom, as the case may be. It has been found that, in use, this cell readily develops leaks at the joints between the wrapped casing wall and the edges of the lid and bottom, as well as at the passages provided for the plate lugs.

It is an object of the invention to provide electrochemical cells having a casing formed of wrapped tape and which can be sealed at both ends of the cell casing easily and yet with great tightness. The passages for the pole connections are also provided very easily and yet adequate protection during use is assured.

In accordance with the invention these, and other objects which will appear, are achieved by wrapping around the electrode stack a tape of insulating, electrolyte resistant material, whose length is preferably several times the circumference of the electrode stack. The tape is coated with adhesive and one or more pole contact plates are attached to it. The oppositely poled electrode lugs are respectively attached to these pole contact plates, and the open head ends of the cell casings are filled with electrolyte resistant casting resin.

In assembling such a structure, the pole contact plates are preferably first attached to a tape of insulating, electrolyte resistant material, whose length is substantially greater than the circumference of the electrode stack to be enclosed, and which is preferably several times as long as that circumference. The exposed portions of the tape are coated with adhesive, and the tape with its attached pole contact plates is then wrapped around the electrode stack. The electrical connectors to the electrode stack are then attached to the pole contact plates of the wrapped cell casing, one head end of the wrapped casing is filled with electrolyte resistant casting resin, and the opposite open end is filled with electrolyte. The latter opening can then also be filled with the same casting resin. It is also possible to "form" the cell first, while it is still open and before completely filling it with resin, and to provide a gas tight closure subsequently, by means of the casting resin.

The wrapped casing can advantageously be formed of insulating electrolyte resistant tape which comes coated with an adhesive, such as a PVC adhesive tape. In that case, the applied pole contact plates are fixed in position on the tape.

For further details, reference is made to the discussion which follows in the light of the accompanying drawings wherein.

The same reference numerals designate similar elements in the different figures.

Figure 1:
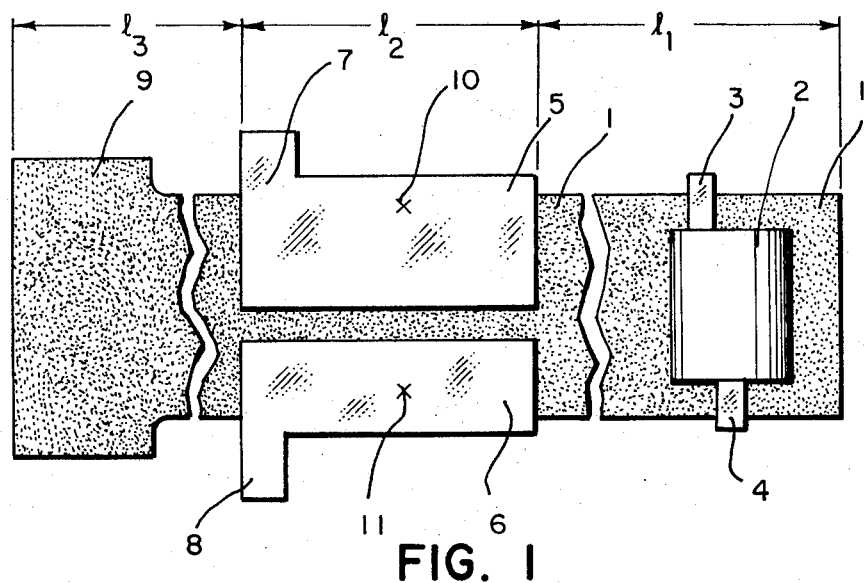
FIG. 1 shows an embodiment of the invention with the tape unwrapped.

FIG. 1, to which reference may now be had, shows an electrode stack 2 in the form of a cylindrical roll and connectors 3 and 4, such as used, for example, in gastight storage battery cells with rolled sinter electrodes. Insulating adhesive tape 1 bears pole contact plates 5 and 6, with their connector lugs 7 and 8. The length $l_1$ of the portion of adhesive tape 1 extending up to the pole contact plates 5 and 6 is so chosen that it is capable of encircling electrode roll 2 at least once. The length $l_2$ of pole contact plates 5 and 6 is preferably at least two times $l_1$ and the length $l_3$ of the remaining portion 9 of the adhesive tape is preferably at least one and one half times $l_1$.

Figure 2:
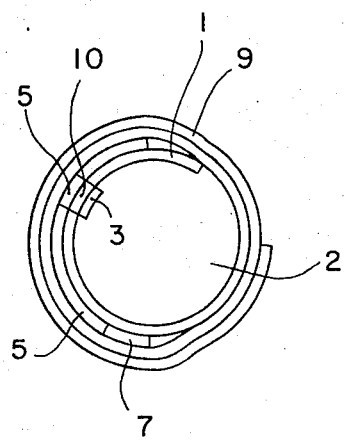
FIG. 2 shows an end view of the embodiment of FIG. 1 with the tape wrapped to form a casing.

The arrangement of FIG. 1, with tape 1 wrapped around electrode stack 2, is shown in FIG. 2.

Wrapping of the adhesive tape around the electrode stack brings the attached pole contact plates close to connectors 3 and 4 of the electrode stack. These connectors are then welded to the respective contact plates, e.g. in the regions of pole contact plates 5 and 6 designated by reference numerals 10 and 11 in FIGS. 1 and 2. For mechanical stability of the wrapped casing, the spacing between pole contact plates 5 and 6 should be as small as possible.

The width of tape 1 should be at least equal to, and preferably somewhat greater than the width of the electrode roll 2. Portion 9 of tape 1 is preferably even wider than the remainder of the tape, but not wide enough to prevent connector lugs 7 and 8 to protrude beyond its edges.

It will be understood that, in FIG. 2, the various wrapped elements are shown in diagrammatic form only, and that their relative lengths are preferably as described above.

As previously noted, tape 1 may be formed of any appropriate plastic material. For example, depending on the electrolyte used, tapes of polyvinyl chloride, polystyrene or polyamide may be employed. For polystyrene or PVC, organic solvents such as butyl acetate or methylene chloride may be used as the adhesive, while for polyamides, oxytoluol or methyl oxybenzol are suitable.

Figure 3:
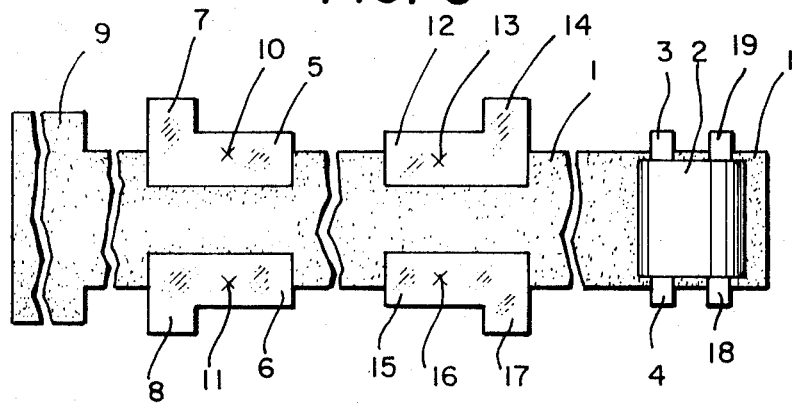
FIG. 3 shows the unwrapped form of another embodiment of the invention.

FIG. 3, to which reference may now be had, shows an arrangement with several pole connectors, as may be used either to increase the connector cross-section or to provide connections for special auxiliary electrodes. In FIG. 3, two such additional pole connectors 18 and 19 are brought out of the electrode stack 2. To make contact with these additional connectors, additional pole connector plates 12 and 15 are provided, attached to tape 1 at appropriate locations.

Figure 4:
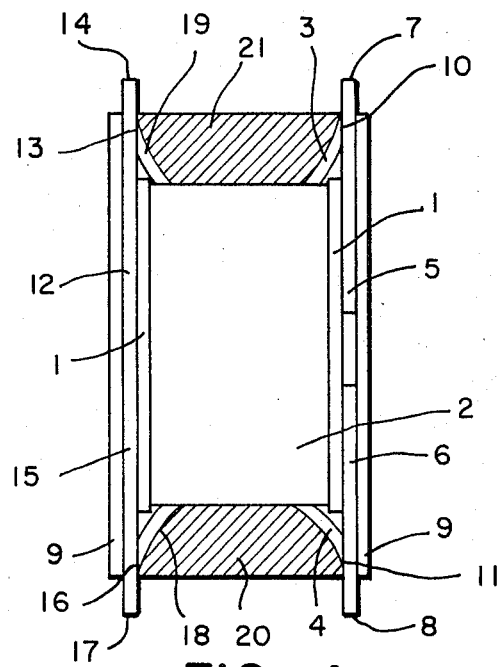
FIG. 4 shows in cross-section an elevation of the arrangement of FIG. 3 with the tape wrapped to form a casing.

FIG. 4, to which reference may now be had, shows a cross-sectional elevation of the arrangement of FIG. 3, after tape 1 has been wrapped around electrode stack 2 and the head ends of the cell filled with casting resin to form plugs 20 and 21.

Figure 5:
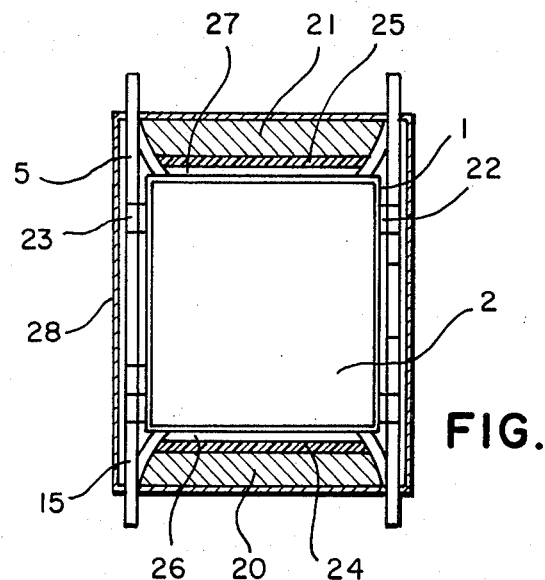
FIGS. 5 and 6 show in cross-section elevations of still other embodiments of the invention.
Figure 6:
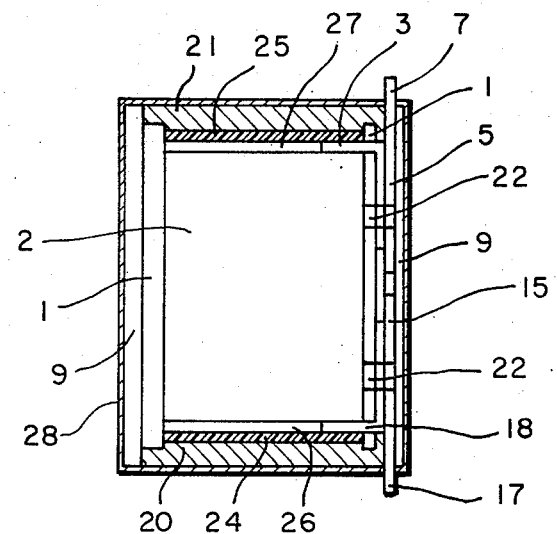

FIG. 5, to which reference may now be had, shows a further embodiment for gas-tight storage batteries. For better oxygen utilization, gas spaces 26 and 27 are provided in this embodiment at opposite ends of electrode stack 2. The cast plugs 20 and 21 then do not rest directly upon electrode stack 2, but are spaced therefrom by insulating plastic plates 24 and 25, respectively. For improved heat dissipation, tape 1 may be provided with apertures 22. Heat dissipation is further promoted by the high thermal conductivity of the pole contact plates. To improve the stability of the wrapped casing, the pole contact plates may also be provided with apertures 23 filled with a suitable adhesive.

If the assembly is to be subjected to high mechanical stresses, then there may be advantageously provided an additional housing 28 of metal or plastic.

A special advantage of the type of cell described above is their high resistance to electrolyte leakage. This is an unexpected advantage which is obtained despite the fact that the variable gas pressure arising in the cell places unequal stresses on the casing in the longitudinal and transverse directions, respectively. The leakage of electrolyte which in previously known arrangements often takes place through the pole passages is considerably diminished by the present invention because pole connections are not made directly to the interior space containing the electrolyte, but rather outside that space through attachment to pole contact surfaces forming part of the casing.

Arrangements in accordance with the invention can also be used for galvanic elements of all types, such as primary cells or storage batteries. They can also be used for stabilizer cells and, if desired, for electrolytic capacitors.

We claim:

1. A casing for an electrochemical device having protruding connectors, said casing comprising:
   an electrically insulating tape wrapped at least once completely around the circumference of said device; and
   electrical connector plates encircled by said tape and partly covered by said wrapped tape, and partly extending beyond the edge of the tape, said protruding connectors being conductively attached to said connector plates.

2. The casing of claim 1, further comprising casting resin closing the head end spaces defined by said wrapped tape.

3. The casing of claim 1, wherein said tape is coated with adhesive and forms a tight seal between overlapping wrapped portions.

4. The casing of claim 3, wherein said tape is of polyvinyl chloride.

5. The casing of claim 3, wherein said tape is coated with adhesive on both sides.

6. The casing of claim 2, wherein said casting resin is spaced from said device forming a chamber at each end of the device.

7. The casing of claim 1, wherein said conductive attachment is by means of welds.

8. The casing of claim 1, wherein at least the interior layers of said wrapped tape are provided with apertures.

9. The casing of claim 1, wherein said connector plates are provided with apertures.

10. The casing of claim 1, wherein said tape is wrapped several times around said device.

* * * * *